(12) United States Patent
Earle

(10) Patent No.: US 6,172,504 B1
(45) Date of Patent: Jan. 9, 2001

(54) METAL DETECTOR TARGET IDENTIFICATION USING FLASH PHASE ANALYSIS

(75) Inventor: John L. Earle, Sweet Home, OR (US)

(73) Assignee: White's Electronics, Inc., Sweet Home, OR (US)

(*) Notice: Under 35 U.S.C. 154(b), the term of this patent shall be extended for 0 days.

(21) Appl. No.: 09/107,088

(22) Filed: Jun. 29, 1998

Related U.S. Application Data

(60) Provisional application No. 60/077,786, filed on Mar. 11, 1998.

(51) Int. Cl.[7] .................. G01V 3/11; G01V 3/165
(52) U.S. Cl. ............................. 324/329; 324/233
(58) Field of Search ..................... 324/239, 326, 324/327, 328, 329, 232, 233; 327/3, 2, 4

(56) References Cited

U.S. PATENT DOCUMENTS 5,148,151 * 9/1992 Podhrasky .................. 324/329
5,523,690 * 6/1996 Rowan ....................... 324/233
6,005,392 * 9/1992 Patzwaldt ................... 324/329

* cited by examiner

Primary Examiner—Jay Patidar
(74) Attorney, Agent, or Firm—Klarquist, Sparkman, Campbell, Leigh & Whinston, LLP

(57) ABSTRACT

A flash phase analysis circuit provides parallel phase channels for simultaneously analyzing a detected signal in each of several phase windows and providing parallel outputs indicating whether a target falls in one of the phase windows. In one implementation, the parallel outputs each drive a segment of an output device to indicate the target type to the user. The flash phase analysis circuit divides a detected signal among the phase windows and then simultaneously compares the measured signal at each phase window with a reference signal. The circuit matches measured data with pre-selected phase characteristics corresponding to known targets in parallel and provides parallel output signals indicating target type.

21 Claims, 5 Drawing Sheets

METAL DETECTOR TARGET IDENTIFICATION USING FLASH PHASE ANALYSIS

RELATED APPLICATION DATA

This application claims priority to co-pending U.S. provisional patent application Ser. No. 60/077,786, filed on Mar. 11, 1998.

TECHNICAL FIELD

The invention relates to metal detectors, and more specifically, to target identification circuitry in metal detectors.

BACKGROUND

Metal detectors typically identify the type of a metal object located in a background environment by analyzing the characteristics of an electrical signal attributable to the target. In particular, some metal detectors identify target type by analyzing the phase relationship between a signal transmitted into the ground and a received signal. For example, some metal detectors use phase detectors, sometimes called "synchronous detectors," to measure the received signal at two different phases, usually 90° apart. When the phase detectors are 90° apart, they are referred to as being in "quadrature." The output of each of the phase detectors is a D.C. signal proportional to the magnitude of the received signal at a selected phase angle. The ratio between these D.C. signals is proportional to the phase relationship between transmitted and received signals.

Conventional metal detectors analyze the measured ratio by sequentially comparing it to a series of expected ratios. Such detectors compare the measured ratio with a series of expected ratios one by one until they find the best match. Typical digital and microprocessor based systems, for example, sequentially analyze measured phase data by stepping through a pre-defined series of ranges to find a best fit. Often, this approach is expensive to implement, causes switching noise and signal delays, and can be less accurate.

SUMMARY OF THE INVENTION

The invention relates to a flash phase circuit and a flash phase analysis method used in a metal detector to evaluate a measured signal relative to two or more preselected phase channels or "windows" simultaneously. The flash phase analysis circuit provides parallel phase channels for simultaneously analyzing a detected signal in each of several phase windows and providing parallel outputs indicating whether a detected metal target falls in one of the phase windows. To provide the parallel phase channels, the flash phase analysis circuit divides a detected signal among the phase windows. There are a variety of alternative configurations for dividing the detected signal among the phase windows. In one approach, the circuit divides a phase detected signal into signal levels for each phase window. In another approach, the circuit analyzes the detected signal in a phase detector for each phase window in parallel.

To analyze and identify the target type, the circuit simultaneously compares the measured signal at each phase window with a reference signal. The circuit matches measured data with pre-selected phase characteristics corresponding to known targets in parallel and provides parallel output signals indicating target type. The reference signal, in one approach, is a phase detected signal. For example, the selected signal levels of a first phase detected signal are compared with a second phase detected signal. In another approach, the reference signal is a constant reference signal for each phase window.

The analysis circuitry provides a parallel output signal for each phase window indicating which phase window matches with the measured phase data. The parallel output signals can be presented to the user in a variety of ways. In one approach, the signals drive display segments in a display device, such that the output appears as a bar graph display. This display is arranged such that the segments are in order of lesser valuable to more valuable targets. When a target is present, it illuminates display segments up to and including the segment corresponding to the matching window. As described further below, a number of output devices may be used to convey the matching phase window to the user.

Additional features of the invention will become apparent with reference to the following description and accompanying drawings.

DETAILED DESCRIPTION

The following description provides examples of how to employ flash phase analysis in a metal detector. In this context, flash phase analysis refers to a process for simultaneously comparing measured phase characteristics of a detected signal with preselected phase characteristics. For example, in one implementation, phase analysis circuitry simultaneously evaluates a measured phase ratio against eight preselected phase ratios. While the precise number of preselected phase values can vary depending on the application, eight preselected ratios can provide the user with reliable and useful information.

In the flash phase analysis devices described below, the preselected phase characteristics correspond to channels of phase data. Each of the channels is preselected for a given phase window or potential target type. This approach enables the measured phase data to be analyzed and viewed at each of these phase windows simultaneously. The phase window that represents the closest match for the measured phase data can be logically recognized and held after the target signal is no longer present.

Before flash phase conversion occurs, a phase detector or detectors measure the phase data. A signal representing the measured phase data is then divided into phase windows such that the measured phase data can be analyzed in each phase window simultaneously. One form of a divider is a resistive divider, but other types of divider circuits may be used as well. Examples of other types of divider circuits include capacitive and inductive dividers.

One form of the measured phase data comprises quadrature phase signals generated by a pair of phase detectors. An alternative implementation might use several phase detectors to generate D.C. phase signals that correspond to the phase windows in the flash phase analysis component of the detector. Examples of these implementations are described further below.

Figure 1:
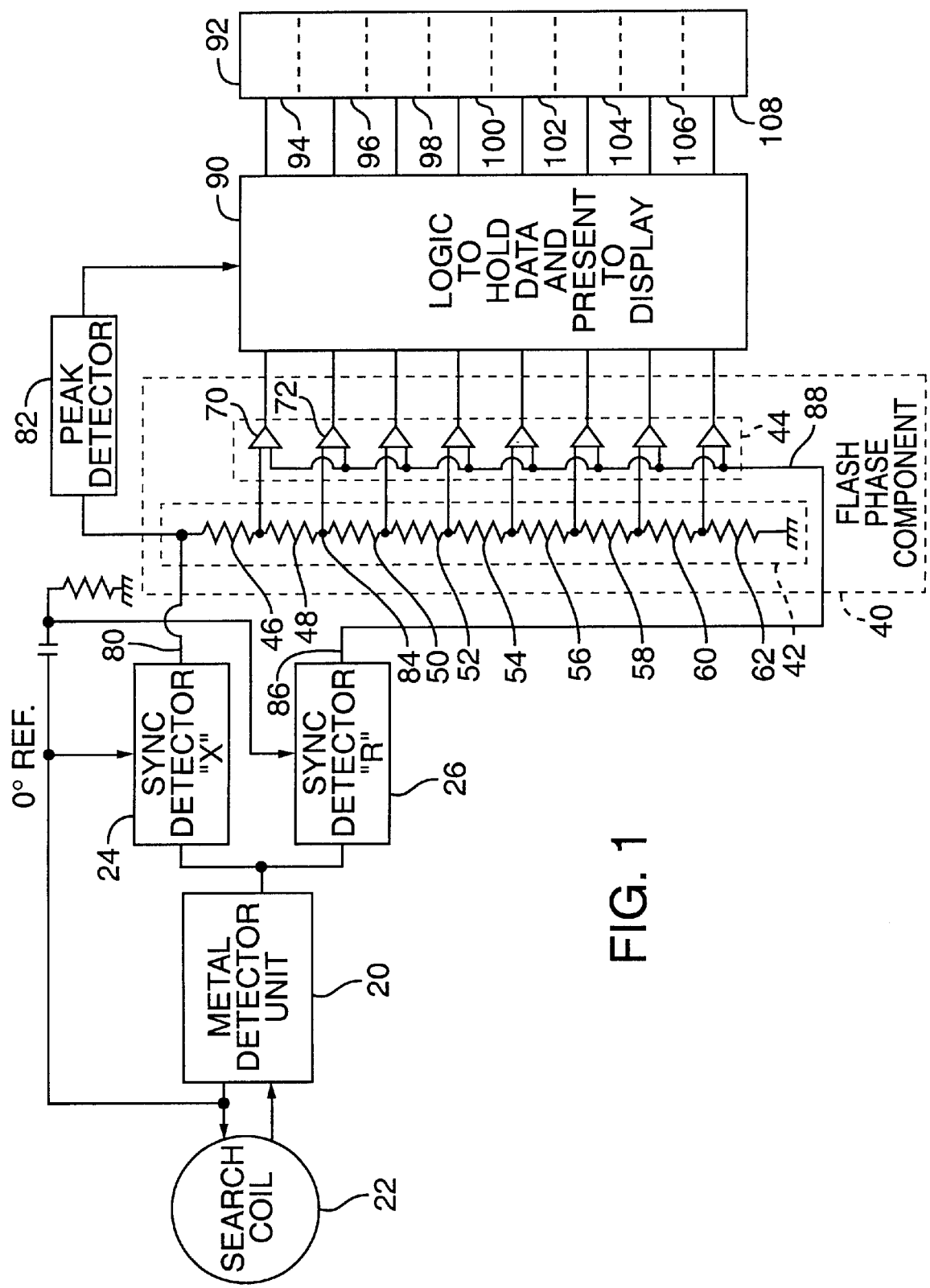
FIG. 1 is a block diagram illustrating one implementation of a metal detector that employs flash phase analysis.

FIG. 1 is a block diagram illustrating one implementation of a metal detector that employs flash phase analysis. The metal detector unit 20 drives a signal into a search coil unit 22. The search coil unit 22 transmits a signal into the background environment and receives a response signal from the background environment. If the background environment includes a metal target, the metal target tends to alter the phase characteristics of the response signal. The detector communicates the received signal to two synchronous detectors 24, 26. In this case, the synchronous detectors 24, 26 are in quadrature: one is in phase with the transmitted signal (the reactive channel 24), while the other is displaced 90 degrees from the transmitted signal (the resistive channel 26).

The terms "reactive" and "resistive" in this context refer to conventions that are sometimes used in the metal detector industry to describe certain phase channels of a detected signal. In this particular case, the reactive channel signal is approximately zero in the presence of a background environment comprised of a ferrite material and no metal target. The resistive channel is approximately 90 degrees out of phase with the reactive channel. It is important to note that the label attached to the phase axes is not critical to the invention. The precise phase angles at which the quadrature signals are measured may vary. In fact, the resistive and reactive channels may be swapped, and in some implementations, need not be precisely 90 degrees apart. Also, the phase axis at which the signal due to the background is zero, sometimes called "ground-balanced," tends to vary. Some detectors include ground balancing circuitry that enables the phase axes to be adjusted for different environments. As such, the precise phase angle of the so-called "resistive" and "reactive" channels may vary even within a single detector.

The flash phase component 40 of the detector includes a divider 42 and a block of comparators 44. Together, the divider 42 and block of comparators 44 form multiple phase channels corresponding to phase windows. In this particular implementation, there are 8 channels in the flash phase component corresponding to 8 phase windows. The divider 42 comprises a chain of resistors 46–62 in series that forms a resistive divider circuit. The block of comparators 44 includes a comparator (e.g., 70 and 72) for each phase channel in the flash phase component.

The output signal 80 from the reactive channel detector is applied to a peak detector and to the input of the divider 42. The reactive channel is preferably adjusted such that the signal due to ground is approximately zero in this channel. As such, the peak detector is designed to detect a peak in the reactive channel signal indicating that a metal target is likely to be in the presence of the search coil. The divider 42 divides the reactive channel signal into 8 signal levels, and each signal level is applied to one of the comparators. For example, the output of the divider 42 at node 84 is applied to one of the inputs of comparator 72. The output signal 86 from the resistive channel detector is applied to the other input 88 of each of the comparators. The comparators each compare a selected level of the reactive channel signal with a reference signal derived from the detected signal. The reference signal, in this implementation is the output of the resistive channel detector 26. It is possible to interchange the resistive and reactive channels and to use phase detectors that are not in quadrature.

In some applications, a single phase detector may be used. In this case, the output of the single phase detector may be supplied to the phase windows and compared with a preselected reference signal for each phase window. Alternatively, the output signal could be divided into different signal levels and compared with a common reference signal for each phase window.

In the implementation shown in FIG. 1, the peak detector 82 polls the flash phase component 40 at the maximum signal strength to control the timing of the flash phase analysis. More specifically, the peak detector 82 controls the timing at which the flash phase component evaluates whether there are any matches between the measured phase data and the preselected phase windows. The peak detector 82 supplies a control signal to a logic circuit 90 that holds the output of the flash phase component and provides this output to a display device 92. In the flash phase component, the block 44 of comparators has eight outputs, one for each comparator. Each of these outputs corresponds to a phase window. The logic circuit 90 has eight inputs and outputs corresponding to the eight phase windows. Finally, the display device has eight display segments 94–108 corresponding to the eight phase windows.

The logic circuit can pass a signal for each phase window for which a match is found and each phase window that is higher in the phase window spectrum than the matching phase window(s). This provides a "thermometer" type effect in the bargraph. In another alternative, the logic circuit can be designed to select a phase window corresponding to the phase window that is the lowest phase window in the phase window spectrum for which a match is found. In this case, the flash phase analysis provides an output signal to drive the display for this segment only.

While the implementation described above employs a segmented display, a variety of different output devices can convey the parallel output indicating the matching phase window to the user. For example, the parallel outputs of the flash phase circuitry can be converted to audio output by an audio transducer that uniquely identifies the matching phase window through unique tones or sounds for each phase window. Similarly, the parallel outputs can be converted to synthesized speech indicating the likely target type. Other display configurations may be used as well. For example, a text based display could display a textual representation of the matching phase window. A graphical display could display a graphical representation of the matching phase window. Combinations of these output devices may be used as well.

Figure 2:
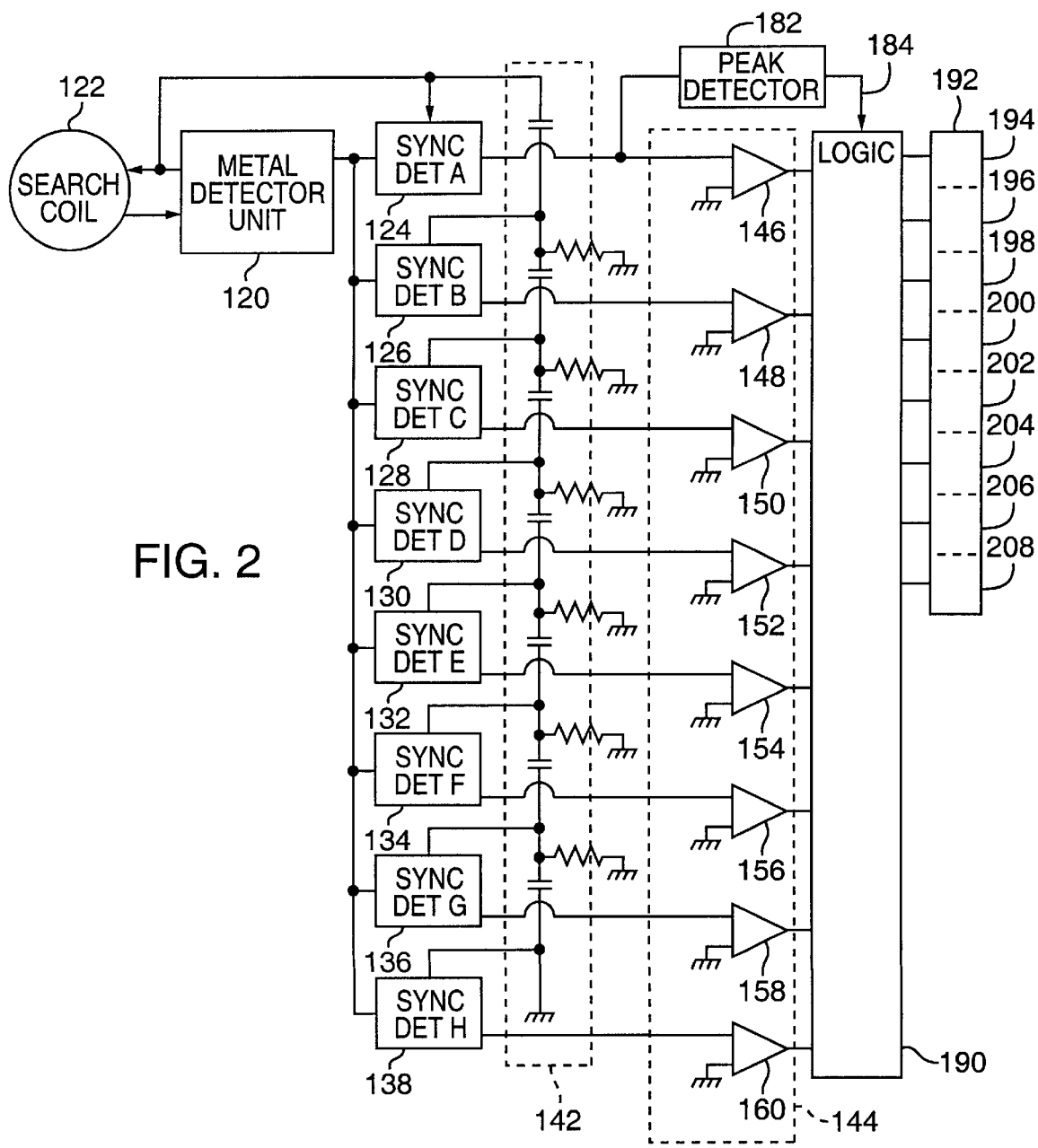
FIG. 2 is a block diagram illustrating an alternative implementation of a metal detector using flash phase analysis.

FIG. 2 is a block diagram illustrating an alternative implementation of a metal detector using flash phase analysis. Like the implementation in FIG. 1, the metal detector unit 120 drives a signal onto a search coil 122, which in turn, detects a signal from the background environment. The metal detector unit 120 provides the signal received from the background to the input of multiple synchronous detectors 124–138 simultaneously. In this particular example, there are 8 synchronous detectors (124–138).

Each of the synchronous detectors corresponds to a phase channel and window of possible phase angles. The metal detector unit 120 provides a phase reference signal for each of the synchronous detectors relative to the signal driven onto the search coil. Specifically, a capacitive phase shifting ladder 142 serves to preselect the phase for each phase window. Alternative circuitry can be used to select the phase reference for each phase window, such as a resistive or inductive ladder circuit.

A flash sensing block 144, comprising a block of comparators (146–160), receives the outputs of the synchronous detectors (124–138). In particular, each synchronous detector has a corresponding comparator that receives its output (e.g., synchronous detector A and comparator 146). The comparators produce a signal indicating whether the measured phase data matches an associated phase window. The comparator block 144 operates on the outputs of the synchronous detectors simultaneously to provide the flash phase analysis function.

A peak detector circuit 182 generates a control signal 184 when it detects a signal peak in the output signal of one of the synchronous detectors 124. In phase with the transmit signal, synchronous detector 124 typically provides a maximum signal when a metal target with a strong eddy current response is present. Thus, the peak signal indicates that a metal target is likely to be in the proximity of the search coil 122. A logic circuit 190 receives the control signal from the peak detector 182 and operates in a similar fashion as the logic circuit 90 of FIG. 1. The logic circuit 190 converts the signals indicating which phase windows match into parallel display enable signals that drive a display device 192. The display enable signals for each phase window indicate whether to activate a corresponding segment (194–208) in the display 192. The logic circuit 190 can be designed to provide a thermometer type drive signal to the segments of a display or can provide a drive signal for the lowest matching phase window. The block of comparators includes a comparator for each phase window. Each comparator compares the output of a corresponding synchronous detector with a reference signal (e.g., ground potential) and provides an output signal indicating whether there is a match for the phase window.

Figure 3A:
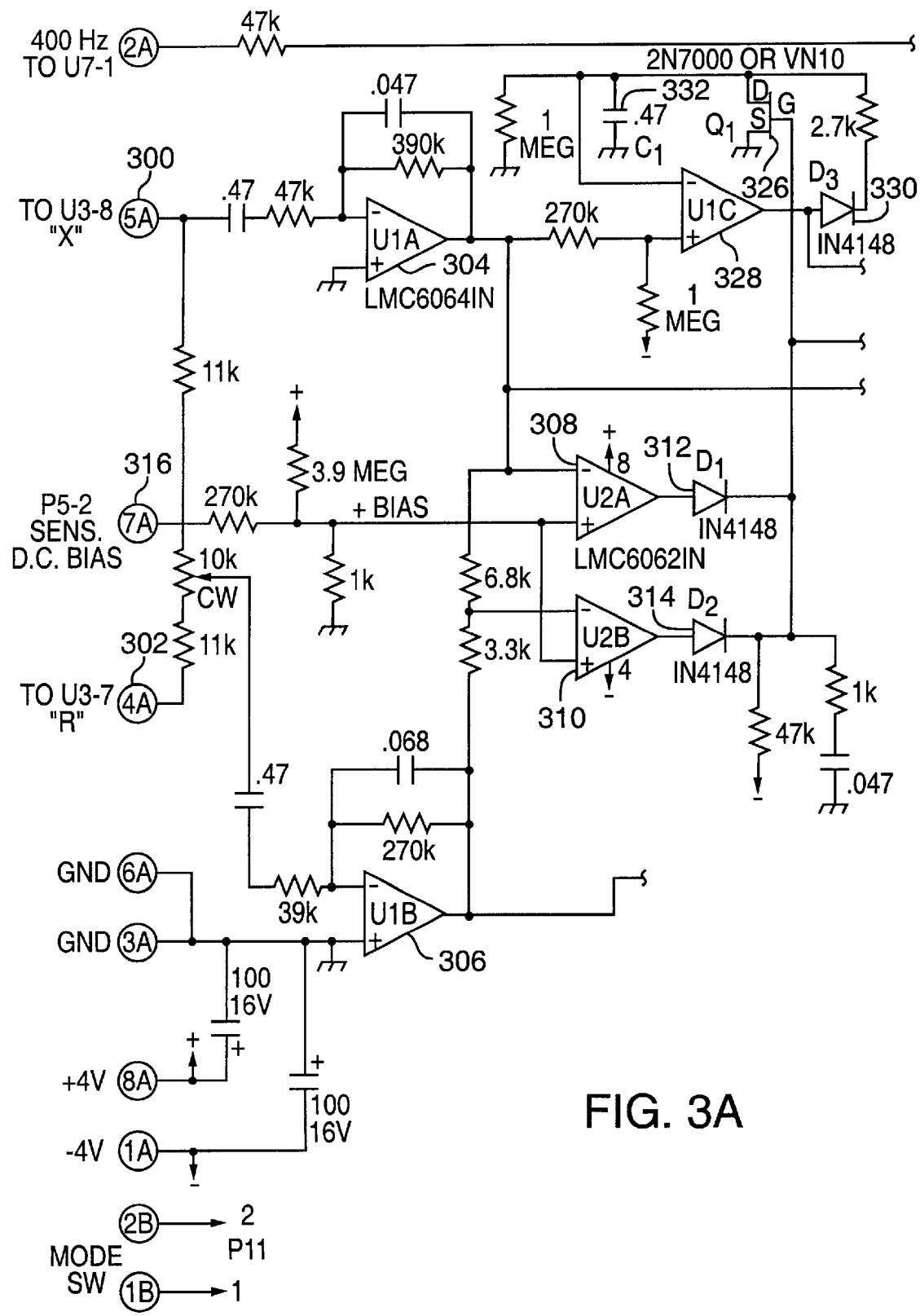
FIGS. 3A and 3B illustrate a detailed schematic diagram of an implementation of a flash phase analysis circuit.
Figure 3B:
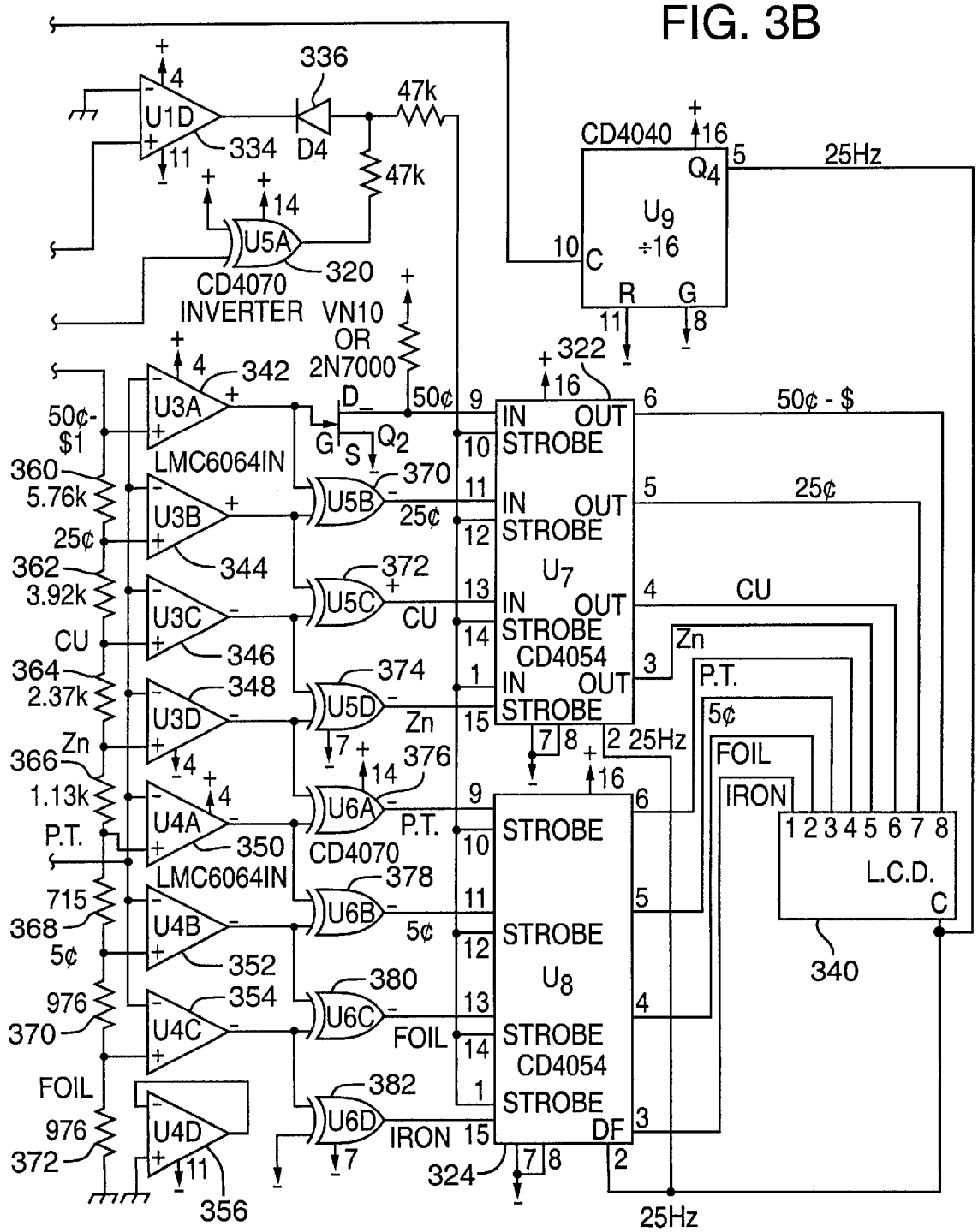

FIGS. 3A and 3B are a detailed schematic diagram illustrating an implementation of a circuit for performing flash phase analysis in a metal detector. This schematic diagram shows how flash conversion may be accomplished for 8 possible phase windows with just two quad op amps. This implementation makes flash phase analysis as economically viable as sequential systems for the same level of resolution.

A host metal detector provides phase data to the flash phase analysis circuit of FIG. 3A. Specifically, the output signal from an "X" channel (the reactive channel) drives pin 5A (300), and the output from the 90-degree displaced "R" channel (the resistive channel) drives pin 4A (302).

Amplifiers U1A & U1B (304, 306) invert, amplify and filter these quadrature signals, passing the pertinent 10 Hz target data while rejecting 1 Hz ground changes.

Amplifiers U2 A & B (308, 310) perform a phase comparison on a selected phase relationship in the first quadrant where ground signals occur. The circuit includes diodes D1 and D2 (312, 314) that combine their outputs with a NAND operation so that their cathodes are high quiescently and when encountering first quadrant ground signals. Significant desirable eddy current targets appear in the second quadrant allowing the cathodes of D1 and D2 to both go low. This "low" signal is a control signal acting as the target window that enables the rest of the analyzing process for any given target.

A small amount of bias is applied to terminal 7A (316) to keep D1 and D2 positive when no target signal is present.

Logic device U5A (320) in FIG. 3B functions as an inverter, whose output is low in the case where there is no target signal. The output of U5A keeps the strobe inputs to logic devices U7 and U8 (322, 324) low, such that they hold and display the last meaningful target data.

Acquisition of a new target that falls within the desired range causes D1 and D2 to go low, which turns off transistor switch Q1. Amplifier U1C (328), diode D3 (330), and capacitor C1 (332) form a peak detector, which is enabled when transistor Q1 turns off. The target signal indicating that a meaningful target is present rises positively, charging capacitor C1 and carrying through amplifier U1D (334) to diode D4 (336). This target signal allows inverter U5A to apply a positive signal to the strobe inputs of U7 and U8. Data is then transferred into logic memory circuits U7 and U8.

At the peak of the signal, which has the maximum signal to noise ratio, the signal at the capacitor C1 equals and exceeds the signal input, causing the output of the amplifier U1C to drop to a negative value rapidly. This change in the output of amplifier U1C indicates the peak has been detected. This signal carries through diode D4 to the strobe lines, locking the strongest, most noise free data in logic circuits U7 and U8. The logic circuits U7 and U8 are conventional CD4054 circuits in this implementation. Logic circuits U7 and U8 drive display segments in a display device 340 such as a L.C.D. device with the current data provided for each phase window from a flash phase analysis.

The flash phase analysis is performed using amplifiers U3, U4 (342–356) and the resistive ratios of the quadrature signals from amplifiers U1A and U1B (304, 306). Resistors 360–372 form a resistive divider circuit. The resistive divider circuit divides the reactive channel signal into eight different voltage levels and supplies the resulting signal to the non-inverting input of amplifiers 342–356. The resistive channel signal is applied to the inverting input of the amplifiers. If the target phase exceeds the preselected resistive ratio of any of the inputs to amplifiers U3–U4, then that amplifier's output is low. Conversely, the amplifier outputs for phase windows that do not exceed the target ratio are high.

The outputs of consecutive amplifiers U3 and U4 are compared using an "Exclusive OR" function implemented in logic gates U5B–D and U6A–D (370–382). The highest amplifier output (up the chain of amplifiers U3A–D: U4A–D) causes a high from only its corresponding Exclusive-OR gate, which is transferred as a logical one through logic circuit U7 or U8 to the correct L.C.D. segment.

Figure 4A:
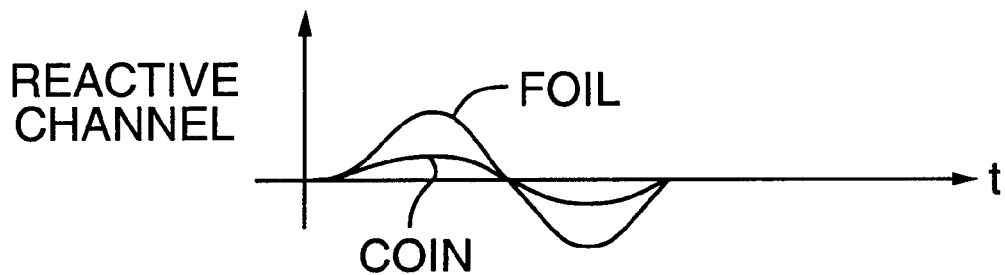
FIGS. 4A–D illustrate waveforms of signals at selected points in the circuit of FIGS. 3A–3B for a variety of target types.
Figure 4B:
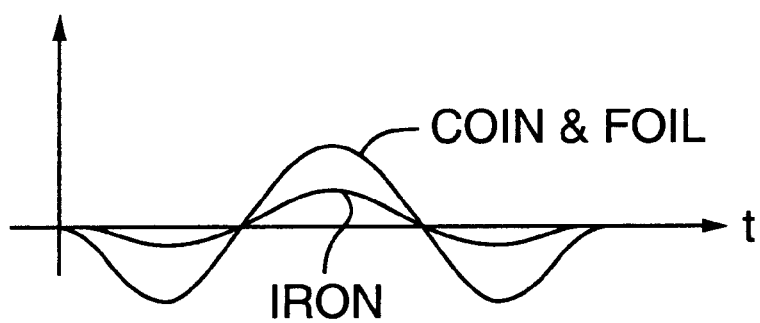
Figure 4C:
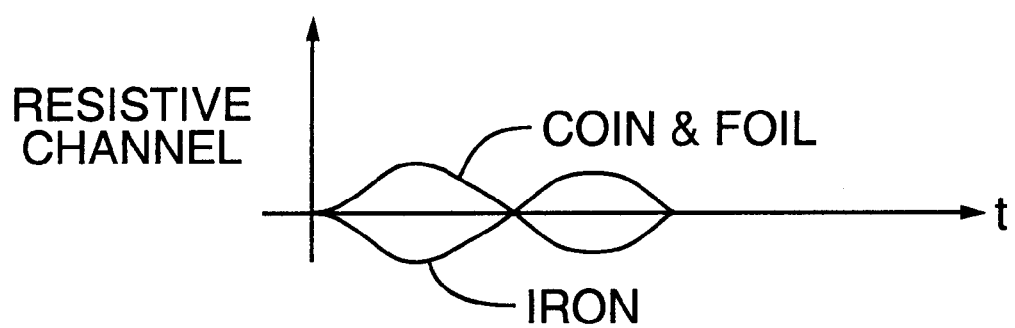
Figure 4D:
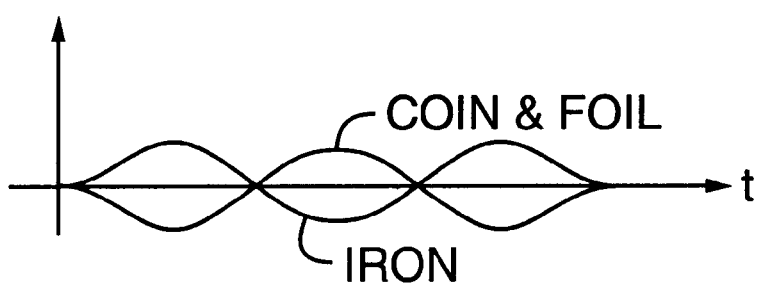

To illustrate the operation of the flash phase circuit, FIGS. 4A–4D show the waveforms of signals at various stages in the circuit. FIG. 4A shows the relative target signal waveforms at the input amplifier UA1 (the X channel) 300, and FIG. 4C shows the target signal at the input amplifier U1B (the R channel) 302. FIG. 4B shows the reactive channel signal at the output of amplifier U1A and FIG. 4D shows the resistive channel signal at the output of amplifier U1B. These waveforms show example metal target types, including foil, a coin, and iron. As shown in these example waveforms, foil has a greater resistive to reactive ratio than a coin. This is due to the fact that eddy current decay time is faster in foil than in a coin. The resistive to reactive ratio provides a measure of the phase characteristics of the target signal and enables the detector to display information indicating target type.

For treasure hunting applications, for example, large coins are obviously much more desirable targets. Large coins typically have a low resistive to reactive ratio. In view of these target signal characteristics, it is convenient to display target information by displaying an indicator of the resistive to reactive ratio. For example, the circuit of FIGS. 3A–3B can be designed to drive the display such that increasing resistive to reactive ratios are displayed on a bargraph from left to right. Higher ratios on the right correspond to less valuable targets, and low ratios on the left correspond to more valuable targets, such as large coins.

In the schematic shown in FIG. 3B, the phase windows at or near the top of the resistive divider circuit correspond to lower resistive to reactive ratios. Conversely, the phase windows at the bottom of the resistive divider correspond to higher resistive to reactive ratios. This implementation of flash phase analysis compares the reactive channel with an attenuated resistive channel. Each of the attenuated components of the reactive channel is compared simultaneously with the resistive channel. The flash phase circuit looks for a match between the attenuated reactive channel signal and the resistive channel. The target signals associated with higher resistive to reactive ratios tend to generate matches at the bottom of the resistive ladder because they require more attenuation of the reactive channel to produce a match with the resistive channel.

In the implementation shown in FIGS. 3A and 3B, the total resistance of the resistive divider is 15.847 k ohms. The phase window associated with foil has a resistor of 976 ohms. Thus, a match occurs at the phase window for foil when the resistive to reactive ratio is roughly 16.2 (15.847 k/976). At the other end of the phase range, the resistive to reactive ratio of the target signal needs to be roughly one to produce a match.

To illustrate the operation of the circuit of FIGS. 3A–B, consider an example where the target is a copper penny. In this case, the comparator U3C associated with the phase window for copper produces a signal indicating that there is a match. The outputs of the comparators for higher resistive to reactive ratios, namely U3D, U4A–D, are negative values (a logical 0 value). The comparators for lower resistive to reactive ratios (U3A–B) receive a more positive signal from the resistive channel than the reactive channel, and as such, produce a positive output (a logical 1 value). The logic circuits U7 and U8 are designed to illuminate segments in a bargraph display corresponding to phase windows up to and including the matching phase window. Alternatively, the logic circuits can be designed to illuminate only the segment for the matching phase window, which is LCD at pin 6 in the case of a copper penny.

The circuit of FIGS. 3A–3B is designed such that for coins and other targets of interest, both the resistive and reactive channels produce positive signals. All iron targets, which are undesirable, exhibit a phase reversal in the resistive channel. As such, the resistive channel signal is negative for iron, and all reactive channel inputs to the comparator block are positive. All of the comparator outputs produce a positive value (logical 1 value) for an iron target. The outputs of the Exclusive OR logic elements U5B–U6C are logic 0, and the output of Exclusive OR U6D is a logic 1. Thus, in the case of an iron target, the final Exclusive OR U6D provides a positive value that drives an LCD segment indicating an iron target is present.

Conclusion

Flash phase analysis circuits described above have a number of advantages. Since flash phase analysis does not involve sequential analog data switching, it minimizes or eliminates switching noise and delays due to the settling time of the sequential switches. Another advantage is that each of the preselected phase ratios can be set accurately using resistively determined ratios. Yet another advantage of flash phase analysis is that it has extremely wide dynamic range with no non-linearity. This attribute enables flash phase analysis to provide the same result for both strong and weak targets in a metal detector.

The flash phase analysis circuitry can be implemented in a variety of ways without departing from the scope of the invention. For example, one or more phase detectors may be used to measure a detected signal. A variety of different forms of divider circuits can be used to divide the measured signal among phase windows, including, for example, a resistive divider, a capacitive divider, and an inductive divider. The analysis circuitry that compares the measured data in each phase window can be implemented in a variety of comparator configurations. A match for each phase window can be evaluated using a reference signal derived from measured data, pre-selected for each window or based on a common signal for all channels.

The output device and the circuitry used to drive it can vary as well. The parallel output signals from the flash phase analysis signals from the flash phase analysis circuitry can be used to drive a display device, audio transducer, or some combination of visual and audio output device indicating the matching phase window.

The circuitry used to instruct the output device when to provide an indicator of target type can vary as well. For example, the above-implementations use a peak detector and logic for holding flash phase analysis results as target identity control circuitry. This form of target identity control determines when a target is likely to be present and enables the output device at a peak target signal. The same or similar function can be achieved by conducting flash phase analysis over an entire period when a selected phase detector, such as a ground balanced detector, senses the presence of a metal target, averaging the measured signals over this period, and providing the results of a flash phase analysis on the averaged data after the period is over.

Another approach is to track the period during which a target is present through one of the phase detectors, record the results of flash phase analysis during this target period, and provide an output signal representing the results of the flash phase analysis at approximately the middle of the period. In short, a variety of target identity control circuits may be used to control the output of the results of a flash phase analysis.

While the invention is described with reference to specific implementations, the scope of the invention is not limited to these implementations. Rather, the scope of the invention is defined by the following claims. I, therefore, claim as my invention all that comes within the scope and spirit of these claims.

I claim:

1. A circuit for analyzing target type of a metal target detected by a metal detector, the circuit comprising:
    two or more phase channels, each operable to receive measured phase data from a detected signal; and
    a flash phase analysis circuit for comparing the measured phase data with preselected phase characteristics simultaneously to determine a match or closest match between the measured phase data and the preselected phase characteristics.

2. The circuit of claim 1 further including:
    a divider circuit forming a phase window for each of the phase channels, such that the preselected phase characteristics are represented by a set of phase windows.

3. The circuit of claim 2 further including a comparator block for simultaneously comparing a measured phase signal in each of the phase channels with a reference signal of the phase channel to indicate whether the measured phase data falls within a phase window corresponding to one of the phase channels.

4. The circuit of claim 3 wherein the comparator block uses a common reference signal for all phase channels.

5. The circuit of claim 3 wherein the reference signal is derived from the measured phase data.

6. The circuit of claim 3 wherein the comparator block is coupled to an output device for simultaneously indicating for each phase channel whether the measured phase data falls within the phase window corresponding to the phase channel.

7. The circuit of claim 6 wherein the output device comprises a display device with a display segment for each phase channel indicating whether the measured phase data falls within the phase window corresponding to the phase channel.

8. The circuit of claim 7 wherein the display device illuminates a series of contiguous display segments up to and including the display segment corresponding to the measured phase data.

9. The circuit of claim 2 wherein the divider circuit comprises a resistive divider for dividing a first phase detected signal into two or more signal levels, each signal level corresponding to one of the phase channels.

10. The circuit of claim 9 further including a comparator corresponding to each of the phase channels, the comparators operable to compare simultaneously a signal level with a second phase detected signal and to produce an output signal indicating whether the measured phase data falls within a phase window corresponding to one of the phase channels.

11. The circuit of claim 2 wherein the divider circuit is operable to create phase reference signals for each of the phase channels; and further including a synchronous detector corresponding to each of the phase channels, each synchronous detector being coupled to the divider circuit to receive one of the phase reference signals; and comparators coupled to the synchronous detector for comparing simultaneously a measured phase signal from each of the synchronous detectors and producing an output signal indicating whether the measured phase data falls within a phase window corresponding to one of the phase channels.

12. The circuit of claim 11 wherein the divider circuit is a capacitive divider circuit.

13. The circuit of claim 11 including:

an output device for indicating target type, and a target identity control circuit coupled to the flash phase analysis circuit for analyzing when a metal target is likely to be present and for controlling transfer of a signal indicating the match or closest match to the output device for a flash phase analysis conducted when the metal target is likely to be present.

14. A circuit for analyzing target type of a metal target detected by a metal detector, the circuit comprising:

means for simultaneously converting a detected signal into a measured phase signal in each of a set of phase windows;

means for simultaneously evaluating the measured phase signal in each phase window to determine whether the measured phase signal is a match for the corresponding phase window; and means for indicating which one of the phase windows matches the measured phase signal.

15. The circuit of claim 14 wherein the means for converting comprises means for simultaneously measuring a received signal at each of more than two phases corresponding to the phase windows, and means for providing phase reference signals at each of the phases; and wherein the means for simultaneously evaluating the measured phase signal comprises means for simultaneously comparing the measured received signal at each phase with a reference signal to produce parallel output signals indicating whether the measured phase signal is a match for the corresponding phase window.

16. The circuit of claim 15 including means for controlling when the parallel output signals are supplied to the means for indicating.

17. The circuit of claim 14 wherein the means for dividing a first measured phase signal into two or more signal levels each corresponding to one of the phase windows; and wherein the means for simultaneously evaluating the measured phase signal comprises means for simultaneously comparing each of the two or more signal levels with a reference signal to produce parallel output signals indicating whether the measured phase signal is a match for the corresponding phase window.

18. The circuit of claim 17 wherein the reference signal is derived from a second measured phase signal in quadrature with the first measured phase signal.

19. In a metal detector, a method for analyzing target type of a metal target detected by the metal detector, the method comprising:

simultaneously converting a detected signal into a measured phase signal in each of a set of phase windows;

simultaneously evaluating the measured phase signal in each phase window to determine whether the measured phase signal is a match for the corresponding phase window; and indicating which one of the phase windows matches the measured phase signal.

20. The method of claim 19 further including:

simultaneously measuring the detected signal at different phase angles, each phase angle corresponding to a phase window to produce the measured phase signals;

simultaneously comparing the measured phase signals to a reference signal to produce parallel output signals indicating whether the measured phase signal in each window is a match for the corresponding phase window.

21. A circuit for analyzing target type of a metal target detected by a metal detector, the circuit comprising:

a first synchronous detector for measuring a detected signal at a first phase;

a second synchronous detector for measuring a detected signal at a second phase;

a resistive divider coupled to the first synchronous detector and comprising a series of resistors separate by nodes;

a block of comparators coupled to the second synchronous detector, and each comparator coupled to one of the nodes of the resistive divider;

a logic circuit coupled in parallel across outputs of the block of comparators for holding output signals of the comparators;

a peak detector coupled to the logic for selecting when to enable the logic to provide parallel output signals corresponding to each comparator to a display device; and the display device having segments corresponding to each of the comparators, and each segment being coupled to the logic to receive one of the parallel output signals.

* * * * *